United States Patent Office 3,320,074
Patented May 16, 1967

3,320,074
PROCESS FOR PRODUCING OF LOW-CALORIE SWEETENING COMPOSITION
Hans T. Gebhardt, Marysville, Ohio, assignor to Afico S.A., Lausanne, Switzerland, a corporation of Switzerland
No Drawing. Filed Dec. 1, 1964, Ser. No. 415,160
5 Claims. (Cl. 99—141)

This invention relates to a new low-calorie sweetening composition having a sweetening power on a volume basis approximately equal to that of cane sugar (sucrose) and which is in the form of a granular free-flowing solid similar in appearance to cane sugar, and to a process for preparing such composition.

It is known in the art to combine non-caloric sweeteners such as cyclamate and/or saccharin with certain bulk extenders to prepare low-calorie sweetening compositions which are more convenient to use than the more common tablet or liquid preparations. The bulk extenders heretofore employed, however, have a variety of disadvantages which substantially reduce their utility. Thus gum arabic and gum tragacanth have been proposed as extenders, but the use of such materials in foodstuffs is undesirable since they may display side-effects such as laxative properties. Such materials have the added disadvantage of not being readily soluble, particularly in cold water. Other extenders, such as the carboxy-alkyl-celluloses, do not dissolve at all but form turbid colloidal suspensions.

To avoid these disadvantages, it has been proposed to use nutritive carbohydrate extenders which are more soluble and which do not display side-effects, thus avoiding the drawbacks of the gums and cellulose derivatives. But the prior art extenders of this type, such as dextrose, have caloric contents comparable to sugar and accordingly cannot constitute a substantial portion of a product which is to have a low caloric content. Other materials, such as pectin, are unsuitable because they form gels on contact with water.

The prior art also attempted to decrease the bulk density of carbohydrate extenders so that a given volume of extender would weigh less and therefore result in ingestion of fewer calories per unit of volume. Only limited success has been achieved through such expedients, and the caloric content of such preparations generally exceeds 6 calories per level teaspoonful (5 cc.). By using substantial quantities of materials such as gum arabic and/or carboxymethylcellulose in conjunction with a carbohydrate extender, products having as little as 5 calories per level teaspoonful have been produced, but such compositions have the expected concomitant disadvantages, viz., poor solubility and side-effects, such as laxative properties.

In contrast, the sweetening compositions of this invention avoid the disadvantages of the prior art materials. I have found that by employing a new and unobvious carbohydrate extender it is possible to prepare sweetening compositions having very low caloric contents. My products contain less than 5.5 calories per level teaspoonful, commonly about 3 calories per level teaspoonful. Thus, the products of this invention result in a sweetening composition containing less than 1/2 the caloric content of cane sugar but having the same sweetening power on a volume basis.

My products are in the form of a granular free-flowing solid which, unlike the prior art compositions, is readily and completely soluble even in cold water. Furthermore, the products of this invention do not require the use of materials such as cellulose derivatives or gums to achieve the low caloric content characteristic of my products. In addition, the sweetening compositions of this invention have the advantage of being nonhygroscopic and retain their free-flowing characteristics upon prolonged exposure to ordinary room atmosphere. By contrast, many of the prior art sweetening compositions are hygroscopic and, on standing, gradually form a hard, agglomerated, non-flowing mass.

My new compositions consist essentially of dextrin having a bulk density below about 0.15 g./cc. and a dextrose equivalent of about zero, and from about 1% to about 12%, preferably from about 4% to about 9%, based upon the weight of the dextrin, of at least one non-caloric artificial sweetener. In addition a small amount of a non-caloric flow conditioner, up to about 0.25% by weight of the dextrin and sweetener, may if desired be included in my sweetening composition.

Dextrins are carbohydrates commonly derived from starch by dilute acid hydrolysis, enzyme action or dry heating. Vegetable, cereal and root starches may be converted to dextrin, and dextrin prepared from tapioca root is particularly preferred because of its white color where the product is to be used as a table sugar substitute. The color of the dextrin is of lesser importance where the product is to be mixed with flavorants or other colored substances. The dextrin may be decolorized or otherwise whitened where color is important.

Desirably, the dextrin employed in this invention should be of a purity such that significant quantities of mono-, di-, and trisaccharides are not present. Such dextrin, and the product made in accordance with this invention, are accordingly essentially free from natural sweetness. By virtue of its freedom from sugars, the product of this invention has a Dextrose Equivalent (percent reducing sugar calculated as dextrose; see "Official Methods of Analysis of the Association of Official Agricultural Chemists," p. 430 [9th ed., 1960]) of zero or very close thereto, not exceeding about 1. Likewise, the dextrin employed in this invention gives no reaction or only a slight reaction with Fehling's solution or with iodine. It is water-soluble and precipitated from aqueous solution by ethanol.

Suitable non-caloric sweeteners include cyclamate (N-cyclohexylsulfamic acid), saccharin (2,3-dihydro-3-oxo-benzisosulfonazole) and mixtures thereof. Pharmacologically acceptable salts of cyclamate and saccharin can also be used and are preferred since they are more readily soluble. Suitable salts include the sodium, potassium, calcium, ammonium and magnesium salts. The sodium salts are to be avoided where the sweetening composition is intended for use by diabetics or others on low sodium diets. A particularly preferred noncaloric sweetener for use in preparing the sweetening compositions of this invention is a mixture of pharmacologically acceptable salts, such as the calcium salts, of cyclamate and saccharin in proportions by weight of approximately 12 parts cyclamate salt per part of saccharin salt.

The proportion of noncaloric sweetener employed is varied within the range specified to obtain the desired sweetness. Desirably, the product may have, on a volume basis, a sweetness corresponding to that of cane sugar.

Optionally, a small amount of flow conditioner, up to 0.25% by weight, can be added. Any pharmacologically acceptable flow conditioner, preferably noncaloric, can be used for this purpose, e.g., tricalcium phosphate or sodium aluminosilicate.

The products of this invention are desirably made by a specific process which, unlike those of the prior art, provides bulk extenders having bulk densities substantially below those heretofore available without the use of emulsifiers, gums, stabilizers or the like. Moreover, the process of this invention provides a product which will not separate or segregate during handling and packaging, the artificial sweetener remaining intimately dispersed among the particles of the bulk extenders and thus insuring that all portions of the product are substantially uniform in composition and will remain so in packaging and even after long periods of storage. In contrast, products made by prior art processes frequently separate during storage and packaging and, therefore, are not uniform throughout.

The process of this invention broadly entails the spray-drying of an aerated aqueous solution of controlled characteristics. More specifically, my process in a preferred embodiment involves spray-drying an aqueous solution of dextrin and at least one suitable non-caloric sweetener. Alternatively, but less preferably, an aqueous solution of dextrin may be spray-dried, and the non-caloric sweetener subsequently admixed with the spray-dried product.

According to the more preferred embodiment, an aqueous solution containing between about 30% to about 65% by weight of dextrin having the characteristics heretofore set forth and up to about 12%, suitably from about 4% to about 9% (based on the weight of the dextrin), of at least one noncaloric sweetener is subjected to a pressure between about 200 to about 2000 p.s.i. A nonreactive, noninflammable gas is introduced to aerate the solution, and the aerated solution is then spray-dried to produce a granular free-flowing solid. The product may have a moisture content of about 10% by weight or less, preferably about 6% or less. After spray-drying, the flow conditioner, if any, is admixed with the granular product by conventional techniques.

The non-caloric sweetener and the dextrin are as described above. Virtually any nonreactive, noninflammable gas that does not react with the constituents of the solution and which is a gas at the operational temperature and pressure can be used. Air, nitrogen, carbon dioxide, helium, carbon tetrafluoride and the like are illustrative satisfactory gases. The amount of aeration gas added should be sufficient to provide a product of the bulk density desired, since bulky density of product is dependent upon the amount of aeration gas. Generally, from about 0.05 to about 0.50 s.c.f. (standard cubic feet) of aeration gas per pound of dissolved dextrin is suitable. A solution temperature of from about 40° F. to about 180° F. has been found satisfactory.

The bulk density of the product is readily controlled by varying solution concentration, amount of aeration gas added, and solution temperature and pressure within the ranges specified. Solution concentration may vary between about 30% and about 65% total solids, but a concentration in excess of about 40% is preferred. Concentrations below about 30% generally are insufficient to obtain the required density, while solutions having a concentration in excess of about 65% become too viscous to give a product of the desired appearance and free-flowing characteristics. Solutions having concentrations between about 40% and about 55% by weight of total solids are most preferred.

The quantity of aeration gas may be adjusted to give the required bulk density in accordance with density measurements made as the spray-drying operation proceeds. Increasing the aeration gas concentration decreases the product density, and conversely. Normally, a concentration between about 0.13 and about 0.25 s.c.f. per pound of dextrin is adequte to achieve the desired density. Solution pressure may be varied from about 200 to about 2000 p.s.i., the exact value chosen depending primarily upon the diameter of the atomizing nozzle, velocity of air flow and other characteristics of drier design. With nozzle diameters of about 0.025″ to 0.030″, pressures between about 450 and about 550 p.s.i.g. are preferred and give a satisfactory product.

Optionally, the aqueous dextrin solution or the water used to prepare the dextrin solution may be pasteurized before spray-drying by any conventional manner known to those skilled in the art, such as by maintaining the solution at an elevated temperature for a substantial period of time. For example, we have found that adequate pasteurization takes place when the solution is maintained at a temperature between 150° F. and 200° F. for from 10 to 20 minutes, though other conditions known to the art may as readily be used. Pasteurization may be particularly advantageous when substantial time may elapse between the preparation of the solution and the spray-drying operation.

The spray-drying apparatus and its operating conditions are generally conventional, it being important that the spray-drying conditions enable production of a product having a moisture content below about 10% and preferably below 6% by weight. Higher product moisture contents or higher dryer temperatures may result in caking of the product. Choice of drying temperatures and drying gas temperature depends upon the characteristics of the spray dryer employed.

The following examples, in which all parts are by weight unless otherwise indicated, are intended to illustrate but not to limit my invention.

*Example 1*

976 parts of edible dextrin derived from tapioca root (total solids content 92.8%) are mixed with 64.1 parts of calcium cyclamate (92.0% total solids) and 5.2 parts of calcium saccharin (87.3% total solids) and then added to 1375 parts of pasteurized water at 140° F. The ingredients are vigorously mixed to dissolve the dextrin and noncaloric sweeteners. In this manner 2420 parts of spray-drying feed solution containing 40% total solids are prepared. The final solution temperature is 130° F.

The solution is subjected to a pressure of 500 p.s.i. and carbon dioxide aeration gas is introduced. The aerated solution is passed through a short section of tubing packed with stainless steel spirals to ensure intimate contacting and mixing of the $CO_2$.

The aerated solution is then forced through ten atomizing nozzles, each nozzle having a diameter of 0.0292 in., into a conventional spray-drying tower at a feed rate equivalent to about 630 pounds of dissolved solids per hour. During the spray-drying operation, samples of the dry solid are taken periodically and the bulk density is measured. Minor variations in aeration gas rate are made to maintain a generally constant and desired product density. The average gas addition is 0.015 pound of carbon dioxide per pound of dissolved solids in the solution. The drying tower is operated with a hot air inlet temperature of 343° F. and an exhaust air temperature of 245° F., and the tower is arranged so that all material recovered by the dust collectors of the dryer's exhaust air system is continuously returned to the spray tower. Thus, the entire dryer output is taken from the bottom of the drying tower.

The dry product obtained from the sprayer dryer is in the form of a granular free-flowing solid containing 2.5% by weight of moisture. The particles of solid are predominately thin-walled, gas-filled spheres with diameters between about 70 and about 300 microns, a small number of particles having diameters up to above 450 microns. The product has an average bulk density between about 0.08 and about 0.12 g./cc., and is similar in appearance to cane sugar.

0.05% of a sodium aluminosilicate (Zeolex) flow conditioner is blended with the spray-dried solid in a conventional batch blender to produce the finished product. The resultant sweetening composition of the invention is a free-flowing non-hygroscopic granular solid having a bulk density of from 0.12 to 0.15 g./cc. and an appearance similar to that of cane sugar.

The sweetness of the product is tested using standard panel testing techniques and displays a sweetness approximately the same as an equal volume of cane sugar. The product has a caloric content of about 3 calories per 5 cc. 10 cc. of product dissolved readily in 250 cc. of water at 40° F.; by contrast, a like volume of cane sugar does not dissolve readily in a like volume of water at like temperature, undissolved sugar remaining after stirring for two minutes.

Example 2

A spray-drying feed solution is prepared using the same ingredients in the same proportion as in Example 1, except that less water is used so that the solution contains 45% total solids.

The spray-drying feed solution is subjected to a pressure of 800 p.s.i., aerated with carbon dioxide and atomized by passing through 12 spray nozzles, each having a diameter of 0.0292 inch, and thence into a spray-dryer arranged as described in Example 1. The inlet air temperature to the dryer is 339° F. and the exhaust air temperature from the dryer is 214° F. The spray-dried material has a moisture content of about 4.5%, a texture and appearance similar to that of granulated sugar, and a bulk density between about 0.10 and 0.13 g./cc.

The spray-dried material is then blended with 0.05% of sodium aluminosilicate (Zeolex) and a free-flowing, white, low-calorie sweetening composition indistinguishable in appearance from granulated sugar is obtained. The product of this example has a caloric content of about 3 calories per level teaspoonful, only about one-sixth that of cane sugar, and can be conveniently packaged for household or commercial use in any of the forms conventionally employed for cane sugar. Tests establish that the product of this example when added to hot or cold beverages produces a sweetness similar to that produced by a like volume of cane sugar. The product of this example, like that of Example 1, dissolves more readily than does cane sugar in either hot or cold beverages.

Example 3

An aqueous solution of edible dextrin (50% total solids) is pasteurized by heating to 160° F. and holding at that temperature for ten minutes. The solution is then cooled to 100° F. and subjected to a pressure of 700 p.s.i., passed through a short packed column where the solution is aerated with nitrogen, and spray-dried to recover the dextrin in the form of a free-flowing, granular solid having a moisture content of about 3.5% and closely resembling cane sugar in appearance. During spray-drying samples of the product are taken at frequent intervals. The bulk densities of these samples are measured and the rate of addition of aeration nitrogen is adjusted in accordance with these measurements, the amount of aeration gas being increased when the sample densities are higher than desired. In this manner, the bulk density of the spray-dried dextrin is controlled to between about 0.08 and about 0.10 g./cc. An average of 0.13 s.c.f. of nitrogen per pound of dextrin is added during the course of the spray-drying operation.

92.9 parts of the spray-dried dextrin are blended with 7.1 parts of a dry blend of powdered calcium cyclamate and powdered calcium saccharin, the weight ratio of cyclamate to saccharin being approximately 12:1. The density of the dextrin-cyclamate-saccharin blend is 0.13 g./cc. The blend is then agglomerated in the conventional manner to prevent segregation of ingredients during storage and handling. The agglomerated product has a bulk density of about 0.15 g./cc. and a caloric content of 2.7 calories per 5 cc. (a volume equivalent to 1 level teaspoonful). The product sweetening composition closely resembles cane sugar and for the same volume, displays about the same sweetness.

A quantity of the product of this example is added to coffee and compared with another sample of coffee to which a like volume of cane sugar is added. Panel tests demonstrate that the two samples cannot be readily distinguished.

Example 4

92.9 parts of dextrin powder derived from tapioca root are blended with 7.1 parts of a mixture of calcium cyclamate and calcium saccharin, the weight ratio of cyclamate to saccharin being approximately 12:1. The dry blend contains about 8% moisture and 92% total solids.

60 parts of the dry blend are dissolved in 40 parts of water at 100° F. to provide a spray-drying feed solution containing 55% total solids. The solution is then subjected to a pressure of about 1500 p.s.i. Carbon dioxide is added to the solution to aerate it and the aerated solution is recirculated through a homogenizing valve to disperse the carbon dioxide uniformly in the solution. The aerated spray mix is passed through atomizing nozzles into a spray-drying chamber. During the spray-drying operation, samples of the dry solid produced are taken and the bulk density is measured. Minor variations in aeration gas rate are made to maintain a generally constant product density. During the course of the spray-drying operation 0.14 s.c.f. of carbon dioxide per pound of dextrin is added.

The sweetening composition obtained from the spray dryer is in the form of a granular, free-flowing solid containing about 4% moisture. The solid has an average bulk density of about 0.12 g./cc. and is similar in appearance to cane sugar. 0.025% of sodium aluminosilicate flow conditioner is then blended with the spray-dried product. The finished sweetening composition has a bulk density of 0.15 g./cc. a caloric content of 2.7 calories/5 cc. is free-flowing, nonhygroscopic, has an appearance similar to that of cane sugar, and for the same volume displays approximately the same sweetness as does cane sugar.

A quantity of the product of this example is used to prepare a salad dressing and compared with another sample of salad dressing to which a like volume of cane sugar is added. The two salad dressings are indistinguishable in appearance and taste. A quantity of the product of this example is packaged and stored for a period of 5 months. At the end of this time, the product is still in the form of a free-flowing solid closely resembling cane sugar in appearance. No evidence of separation or segregation of the noncaloric sweeteners from the dextrin is noted. The bulk density of the packaged and stored product remains unchanged.

Example 5

630 parts of dextrin derived from tapioca root are dissolved in 370 parts of water at 180° F. The solution is allowed to cool to 120° F. and is then subjected to a pressure of 1800 p.s.i. and passed through a short packed column where the solution is aerated with compressed air. The reacted solution is spray-dried to recover the dextrin in the form of a free-flowing, granular solid having a moisture content of 5% by weight which closely resembles cane sugar in appearance. During spray-drying, samples of the product are taken at frequent intervals. The bulk densities of these samples are measured and the feed rate of aeration air is adjusted in accordance with these measurements, the amount of aeration gas being increased when the sample densities are higher than desired. An average of 0.16 s.c.f. of air per pound of dextrin is added during the course of the spray-drying operation.

91 parts of the spray-dried dextrin are mixed with 9 parts of a dry blend of powdered sodium cyclamate and powdered sodium saccharin having a weight ratio of approximately 11.2 parts of sodium cyclamate per part of sodium saccharin to produce the low-calorie sweetening composition of the invention. The finished product has a bulk density of 13 g./cc. and a caloric content of 2.7 calories per 5 cc. (equivalent to one level teaspoonful), and thus has only one-sixth the calories of a comparable volume of granular sugar. The appearance of the product closely resembles cane sugar and, for the same volume, displays about the same sweetness.

Portions of the product of this example are added to a variety of food substances, including coffee, beverage mixes, cereals, grapefruit and the like and compared with controls prepared with an equal volume of cane sugar. In most instances, no significant difference is noted between the food products prepared with the low-calorie sweetening compositions of this invention and those prepared from cane sugar. In some instances, a slight aftertaste, characteristic of the cyclamate, could be detected.

It is thus apparent that the sweetening compositions of this invention have significant advantages over the prior art materials. They have a substantially lower calorie content per unit volume than the materials of the prior art, they are readily manufactured and do not require the use of side-effect producing materials in their manufacture. They are highly soluble, even in cold water.

I claim:

1. A process for preparing a sweetening composition, comprising subjected to a pressure of from about 200 p.s.i. to about 2000 p.s.i. at a temperature between about 40° F. and about 180° F. an aqueous solution containing between about 30% to about 65% by weight of dextrin substantially free of mono-, di-, and trisaccharides and from about 1% to about 12%, based on the weight of the dextrin, of noncaloric artificial sweetener, aerating the pressurized solution with noninflammable gas unreactive with the constituents of said solution, and spray-drying the aerated solution to produce a granular, free-flowing solid, the amount of aeration gas being sufficient to provide a product having a bulk density not exceeding 0.15 g./cc.

2. A process for preparing a sweetening composition, comprising subjecting to a pressure of from about 200 p.s.i. to about 2000 p.s.i. at a temperature between about 40° F. and about 180° F., an aqueous solution containing between about 40% and about 55% by weight of dextrin substantially free of mono-, di-, and trisaccharides and from about 4% to about 9%, based on the weight of the dextrin, of at least one noncaloric artificial sweetener selected from the group consisting of saccharin, cyclamate and the pharmacologically acceptable salts thereof, aerating the pressurized solution with about 0.05 to about 0.50 s.c.f. of noninflammable gas unreactive with the constituents of said solution, per pound of dextrin, and spray-drying the aerated solution to produce a granular, free-flowing solid having a bulky density not exceeding 0.15 g./cc.

3. A process for preparing a sweetening composition, comprising subjecting an aqueous solution containing between about 30% to about 65% by weight of dextrin substantially free of mono-, di-, and trisaccharides to a pressure of from about 200 p.s.i. to about 2000 p.s.i. at a temperature between about 40° F. and 180° F., aerating the pressurized solution with about 0.05 to about 0.50 s.c.f. of noninflammable gas unreactive with the constituents of said solution per pound of dextrin, spray-drying the aerated solution to produce a granular, free-flowing solid having a bulk density not exceeding 0.15 g./cc. and admixing with said spray-dried product from about 4% to about 9%, based on the weight of the dextrin, of at least one noncaloric artificial sweetener selected from the group consisting of saccharin, cyclamate, and the pharmacologically acceptable salts thereof.

4. A process for preparing a sweetening composition, comprising spray-drying a pressurized, aerated, aqueous solution containing between about 30% and about 65% by weight of dextrin substantially free of mono-, di-, and trisaccharides, and from about 1% to about 12%, based on the weight of the dextrin, of noncaloric artificial sweetener, under conditions producing granular, free-flowing particles having a moisture content below about 10%, said solution being aerated with sufficient gas which is noninflammable and unreactive with the constituents of said solution to provide a product having a bulk density not exceeding 0.15 g./cc.

5. A process for preparing a sweetening composition, comprising pressurizing an aqueous solution containing between about 30% and about 65% by weight of dextrin having a dextrose equivalent not exceeding about 1, and from about 4% to about 9%, based on the weight of the dextrin, of cyclamate, saccharin, or the pharmacologically acceptable salts thereof, aerating said pressurized solution with a noninflammable gas unreactive with the constituents of said solution, and spray-drying said pressurized solution under conditions providing granular, free-flowing particles having a moisture content below about 6%, the amount of said aeration gas being sufficient to provide a product having a bulky density not exceeding about 0.15 g./cc.

References Cited by the Examiner

UNITED STATES PATENTS

| | | | |
|---|---|---|---|
| 2,876,105 | 3/1959 | Jucaitis et al. | 99—141 |
| 3,170,801 | 2/1965 | McNaught | 99—141 |

FOREIGN PATENTS

| | | |
|---|---|---|
| 14,375 | 8/1963 | Japan. |

OTHER REFERENCES

Rose et al., The Condensed Chemical Dictionary, Reinhold Publishing Co. New York, 1956, page 350.

A. LOUIS MONACELL, *Primary Examiner.*

RAYMOND N. JONES, S. E. HEYMAN,
*Assistant Examiners.*